(12) United States Patent
Erickson et al.

(10) Patent No.: US 7,741,405 B2
(45) Date of Patent: Jun. 22, 2010

(54) ELASTOMERIC COMPOSITION

(75) Inventors: John P. Erickson, Southgate, MI (US);
William P. Venier, Riverview, MI (US);
Cord Schmalkuche, Damme (DE);
Franz Redl, Shanghai (CN); Diane Langer, Syke (DE)

(73) Assignee: BASF Corporation, Florham Park, NJ (US)

( * ) Notice: Subject to any disclaimer, the term of this patent is extended or adjusted under 35 U.S.C. 154(b) by 197 days.

(21) Appl. No.: 11/860,702

(22) Filed: Sep. 25, 2007

(65) Prior Publication Data
US 2009/0082522 A1    Mar. 26, 2009

(51) Int. Cl.
C08G 18/28    (2006.01)
C08G 59/14    (2006.01)

(52) U.S. Cl. ...................................... 524/590; 524/459
(58) Field of Classification Search .................. 524/590
See application file for complete search history.

(56) References Cited

U.S. PATENT DOCUMENTS

| 6,432,543 | B2 | 8/2002 | Harrison et al. | |
| 6,590,057 | B1 | 7/2003 | Brecht et al. | |
| 2005/0277724 | A1* | 12/2005 | Pavlinac | 524/445 |
| 2006/0009605 | A1* | 1/2006 | Erickson et al. | 528/44 |
| 2006/0281894 | A1* | 12/2006 | Dexheimer | 528/416 |
| 2007/0010644 | A1* | 1/2007 | Erickson et al. | 528/48 |
| 2007/0078253 | A1 | 4/2007 | Ulbrich et al. | |

OTHER PUBLICATIONS

BASF Technical Data Sheet of Polyetheramine T 5000.*

* cited by examiner

*Primary Examiner*—Ling-Siu Choi
*Assistant Examiner*—Hui Chin
(74) *Attorney, Agent, or Firm*—Howard & Howard Attorneys PLLC

(57) ABSTRACT

An elastomeric composition includes a reaction product of an isocyanate component and a resin component comprising a polyol and a polyetheramine in the presence of a first catalyst comprising a metal and a second catalyst comprising an amine. An elastomeric system and a method of making an elastomer are provided. The method includes providing the isocyanate component and the resin component, combining the resin component and the isocyanate component in the presence of the first and second catalysts to form an elastomeric composition, applying the elastomeric composition to a mold having a mold cavity, curing the elastomeric composition to form the elastomer, and demolding the elastomer from the mold cavity. An article including a first layer formed from the elastomeric composition emits less than 100 μg/g of volatile organic compounds over 0.5 hour at 90° C.

28 Claims, 8 Drawing Sheets

ELASTOMERIC COMPOSITION

BACKGROUND OF THE INVENTION

1. Field of the Invention

The subject invention generally relates to an elastomeric composition used to form an elastomer. The subject invention also generally relates to an elastomeric system and a method of making the elastomer.

2. Description of the Related Art

Various elastomeric compositions have been investigated for use in industrial processes to form elastomers. Elastomers can be used in a wide variety of applications including both automotive and non-automotive components. Elastomers are non-foamed and comprise, for example, a reaction product of an isocyanate and a polyol and/or an amine. In the past, efforts to reduce levels of volatile organic compounds (VOCs) associated with formation of the elastomers and with articles formed from the elastomers, to minimize production costs, and to provide elastomers having excellent adhesion to surface coatings have been unsuccessful.

The VOCs typically include organic compounds that evaporate into the air from carrier solvents for catalysts, UV absorbers, hindered amine light stabilizers, and antioxidants comprising styrenes, glycols, ethers, esters, toluenes, amines, phenols, and ketones. VOCs increase potential environmental pollution that may accompany the use of components and/or articles that emit VOCs. VOCs also typically increase odors in a passenger compartment of an automobile.

Production costs associated with elastomeric compositions and elastomers include costs spent on raw materials, costs for controlling an amount of water and humidity in storage vessels and a production environment to ensure an efficient cure of the elastomer, costs for extra labor necessary for adding powdered raw materials, and time expended on inefficient reactions of the polyol and the isocyanate.

As is well known in the art, the reaction of the polyol and the isocyanate typically proceeds slowly, thereby decreasing a cost effectiveness of the reaction. As a result, catalysts are used to increase the rate of the reaction. The catalysts may include organotin compounds, zinc carboxylates, bismuth carboxylates, amines and organomercury compounds.

Many of these catalysts not only increase the rate of the reaction of the polyol and the isocyanate, but also catalyze a reaction of the isocyanate with any water and humidity present in the production environment, which is undesirable. Water and humidity, if present, are known to react with the isocyanate to form gaseous carbon dioxide. The formation of gaseous carbon dioxide leads to a formation of voids and blisters in the elastomer, which decreases structural integrity and density of the elastomer. As such, production costs associated with forming the elastomers are also high due to the need to remove water and humidity from the production environment.

Many of these catalysts are also deactivated when exposed to water and humidity. As a result, any water or humidity present in the production environment not only reacts with the isocyanate, but also deactivates the catalyst and prevents any further use of the catalyst. This potential deactivation of the catalyst requires more catalyst to be used in the reaction of the polyol and the isocyanate. Consequently, using more catalyst in the reaction increases production costs.

Efforts have been made to simultaneously reduce water and humidity present in the reaction vessels and to minimize production costs. One effort includes the addition of powdered particulates such as moisture scavengers, molecular sieves, and fumed silica to the isocyanate, the polyol, and/or the amine to absorb any water and humidity present. However, the addition of powdered particulates, although useful for absorbing water and humidity and for decreasing formation of the gaseous carbon dioxide, is expensive and increases production costs.

Additionally, many elastomeric compositions form elastomers that do not sufficiently adhere to surface coatings. Many elastomers formed from elastomeric compositions of the related art have appearance defects and increased delamination of the surface coating and contribute to decreased customer satisfaction.

Due to the inadequacies of the existing elastomeric compositions, there remains an opportunity to provide an elastomeric composition having reduced VOC emissions, minimized production costs, and excellent adhesion of elastomers formed from the elastomeric composition to surface coatings.

SUMMARY OF THE INVENTION AND ADVANTAGES

The elastomeric composition of the present invention includes a reaction product of an isocyanate component and a resin component comprising a polyol and a polyetheramine in the presence of a first catalyst comprising a metal selected from the group of tin, titanium, zirconium, hafnium, and combinations thereof, and a second catalyst comprising an amine. The present invention further provides an elastomeric system which includes the resin component, the isocyanate component, the first catalyst, and the second catalyst described above.

The present invention further provides a method of making an elastomer. The method includes the steps of providing the isocyanate component, providing the resin component, and combining the resin component and the isocyanate component in the presence of the first catalyst and the second catalyst to form an elastomeric composition. The method also includes applying the elastomeric composition to a mold having a mold cavity and curing the elastomeric composition to form the elastomer. The method further includes demolding the elastomer from the mold cavity.

The elastomer emits reduced levels of volatile organic compounds (VOCs) as compared to conventional elastomers. This reduction of VOCs minimizes potential environmental pollution and reduces potential odors from use of the elastomer in the passenger compartment of an automobile, which increases customer satisfaction.

The present invention utilizes an interaction between the first catalyst and the second catalyst to form the elastomer. As such, the catalysts are typically balanced to achieve desirable properties in the elastomer. The interaction between the first catalyst and the second catalyst facilitates a formation of the elastomer having improved tensile strength, Graves tear strength, and elongation. An improved tensile strength of the elastomer reduces a chance that the elastomer may fail. An improved Graves tear strength of the elastomer reduces a possibility that the elastomer may tear. Increasing elongation of the elastomer improves flexibility. Improved tensile strength, Graves tear strength, and elongation of the elastomer increases marketability of the elastomer.

The first catalyst, including the metal selected from the group of tin, titanium, zirconium, and hafnium, has excellent catalytic efficiency for the reaction of the polyol and the isocyanate. The excellent catalytic efficiency increases the rate of the reaction, i.e., decreases a gel time. Consequently, the elastomeric composition can be sprayed while minimizing dripping that typically accompanies spraying the resin component and isocyanate component when these components are not reacted or when these components are reacting slowly. When dripping is minimized, the elastomeric composition is used more efficiently, thereby further minimizing production costs. An increased rate of reaction also allows the elastomeric composition to be sprayed, and the elastomer formed from the elastomeric composition to be demolded in a short period of time, which further minimizes production costs associated with time spent waiting for demolding.

The first catalyst also has a decreased sensitivity to water and humidity present in a production environment and is, therefore, not quickly deactivated when exposed to water and humidity. Also, less catalyst is required for use in the reaction, and costs are therefore minimized. The first catalyst does not effectively catalyze an undesired side reaction of water with the isocyanate component that forms gaseous carbon dioxide. Rather, the first catalyst effectively catalyzes a desired reaction of the polyol with the isocyanate component. As such, the elastomer has structural integrity and a sufficient density, which increases marketability.

Without intending to be limited by theory, it is believed that the second catalyst contributes to excellent adhesion of the elastomer to surface coatings by interacting with the chemical components of the surface coating. Excellent adhesion contributes to improved appearance of the elastomer and to increased customer satisfaction, and minimizes delamination of the surface coating.

BRIEF DESCRIPTION OF THE DRAWINGS

Other advantages of the present invention will be readily appreciated, as the present invention becomes better understood by reference to the following detailed description when considered in connection with the accompanying drawings wherein.

DETAILED DESCRIPTION OF THE INVENTION

Figure 1:
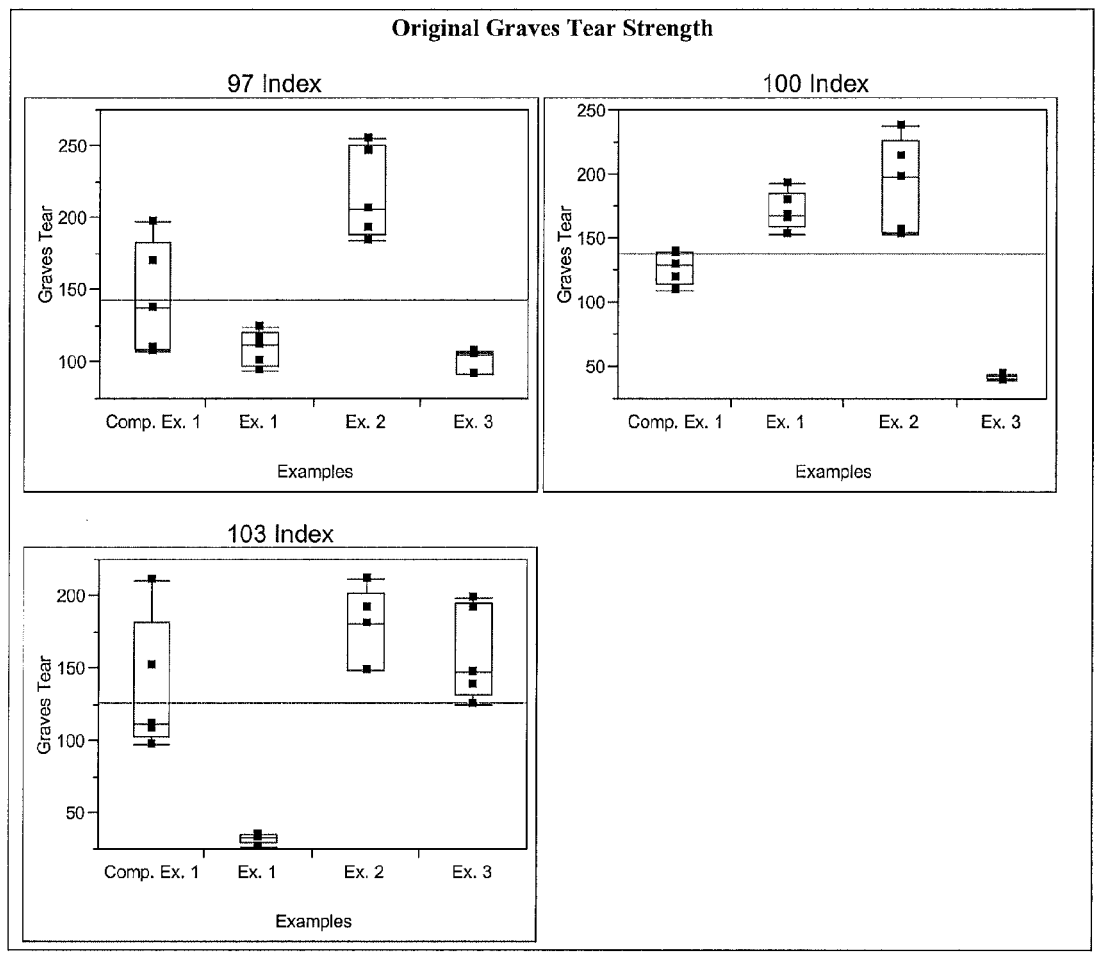
FIG. 1 is a distribution graph illustrating original Graves tear strength of the elastomers of Comparative Example 1 and Examples 1 through 3, in pounds per linear inch at room temperature.

The present invention provides an elastomeric composition, an elastomeric system, and a method of making an elastomer. The elastomeric composition may be used to form elastomers useful for automotive applications. However, it is to be appreciated that the elastomeric composition, system, and method of the present invention can have applications beyond automotive applications, such as farming, outdoor sport, and marine applications.

The elastomeric composition of the present invention comprises a reaction product of an isocyanate component and a resin component including a polyol and a polyetheramine in the presence of a first catalyst and a second catalyst. The elastomer is typically formed from the elastomeric composition, as described in more detail below. The elastomer of the present invention is not foamed. Any foaming that occurs is not desired, is alternatively minimized and is preferably eliminated.

The elastomer may be classified as a polyurethane elastomer, a polyurea elastomer, or a polyurethane/polyurea elastomer. The elastomer typically comprises urethane linkages formed from a reaction of the polyol and the isocyanate component and/or urea linkages formed from a reaction of the polyetheramine and the isocyanate component. One skilled in the art typically classifies the elastomer as a polyurethane elastomer in an embodiment having greater than 50 percent urethane linkages based on a total number of linkages of the elastomer. Alternatively, one skilled in the art typically classifies the elastomer as a polyurea elastomer in an embodiment having greater than 50 percent urea linkages based on the total number of linkages in the elastomer. Alternatively, one skilled in the art may classify the elastomer as a polyurethane/polyurea elastomer in an embodiment having both urethane linkages and urea linkages.

The isocyanate component typically comprises an isocyanate selected from the group of aromatic isocyanates, aliphatic isocyanates, and/or combinations thereof. Examples of suitable isocyanates include, but are not limited to, isophorone diisocyanate, hemamethylene diisocyanate, hexamethylene diisocyanate, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4''-triphenylmethane triisocyanate polymethylene polyphenylene polyisocyanate and 2,4,6-toluene triisocyanate, tetraisocyanates such as 4,4'-dimethyl-2,2',5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, prepolymers, corresponding isomeric mixtures thereof, and combinations thereof. A suitable isocyanate is Lupranate® MM103, commercially available from BASF Corporation of Florham Park, N.J.

If the isocyanate includes an aromatic isocyanate, the isocyanate may also include a modified multivalent aromatic isocyanate, i.e., a product which is obtained through chemical reactions of aromatic diisocyanates and/or aromatic polyisocyanates. Examples include polyisocyanates including, but not limited to, ureas, biurets, allophanates, carbodiimides, uretonimines, and isocyanurate and/or urethane groups including diisocyanates and/or polyisocyanates such as modified diphenylmethane diisocyanates. The isocyanate may also include, but is not limited to, modified benzene and toluene diisocyanates, employed individually or in reaction products with polyoxyallkyleneglycols, diethylene glycol, dipropylene glycol, polyoxyethylene glycols, polyoxypropylene glycols, polyoxypropylenepolyoxethylene glycols, polyesterols, polycaprolactones, polyoxypropyleneamines, polyoxyethyleneamines, polyalkoxyamines, and combinations thereof. Typically, in the present invention, the isocyanate is selected from the group of 2,4'-diphenylmethane diisocyanate, 4,4'-diphenylmethane diisocyanate, modified 2,4'-diphenylmethane diisocyanate, modified 4,4'-diphenylmethane diisocyanate, and combinations thereof. The isocyanate may also include stoichiometric or non-stoichiometric reaction products of the aforementioned isocyanates. A suitable modified diphenylmethane diisocyanate is Lupranate® MP102, commercially available from BASF Corporation of Florham Park, N.J. However, it is contemplated that in all embodiments of the present invention, any isocyanate known in the art may be used in the present invention.

The isocyanate typically has a % NCO content of from 10 to 30, more typically from 18 to 26, and most typically from 20 to 24 percent by weight. Determination of the % NCO content on percent by weight is accomplished by a standard chemical titration analysis known to those skilled in the art. Also, the isocyanate typically has a nominal functionality of from 1.9 to 3, more typically from 1.9 to 2.3. Further, the isocyanate typically has a number average molecular weight of from 125 to 525, more typically from 140 to 420, and most typically from 183 to 420 g/mol. Still further, the isocyanate typically has a viscosity of from 15 to 2000, more typically from 50 to 1000, and most typically from 50 to 700 cps at 25° C.

The resin component comprises the polyol and the polyetheramine. When combined, the resin component and the isocyanate component typically react to form the elastomer, as described in more detail below. The resin component is typically classified as "low-VOC". It is to be appreciated that the terminology "low-VOC" refers to a resin component that may include antioxidants, such as Irganox® 1135, commercially available from Ciba Specialty Chemicals of Tarrytown, N.Y., and/or ultraviolet absorbers, such as Tinuvin® 571, commercially available from Ciba Specialty Chemicals of Tarrytown, N.Y., and/or hindered amine light stabilizers, such as Tinuvin® 765, commercially available from Ciba Specialty Chemicals of Tarrytown, N.Y. The "low VOC" resin component is typically useful for forming elastomers that emit less than 100, more typically less than 85, and most typically less than 75 µg/g of volatile organic compounds over 0.5 hour at 90° C. in accordance with the VDA 278 test method. This reduction of VOCs minimizes potential environmental pollution and reduces potential odors from use of the elastomer in the passenger compartment of an automobile, which increases customer satisfaction.

The polyol is typically selected from the group of polyetherols, polyesterols, polycaprolactones, and combinations thereof. Typically, the polyol includes a polyetherol. The polyol is typically formed from a reaction of an initiator and an alkylene oxide. Typically, the initiator is selected from the group of aliphatic initiators, aromatic initiators, aminic initiators, and combinations thereof. Alternatively, the initiator is typically selected from the group of ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, monoethanolamine, diethanolamine, triethanolamine, and combinations thereof. Alternatively, the initiator is selected from the group of glycerol, 1,1,1-trimethylolpropane, and combinations thereof. However, it is contemplated that any suitable initiator known in the art may be used in the present invention.

The alkylene oxide that reacts with the initiator to form the polyol is typically selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. Alternatively, the alkylene oxide is selected from the group of ethylene oxide, propylene oxide, and combinations thereof. Alternatively, the alkylene oxide includes propylene oxide. However, it is also contemplated that any suitable alkylene oxide that is known in the art may be used in the present invention.

In an embodiment where the polyol is the polyetherol, the polyol also typically includes an alkylene oxide cap. It is to be understood that the terminology "cap" refers to a terminal portion of the polyetherol. The alkylene oxide cap typically includes ethylene oxide, propylene oxide, butylene oxide, amylene oxide, and combinations thereof. The alkylene oxide cap typically includes ethylene oxide. The alkylene oxide cap is typically of from 5 to 20, more typically from 10 to 20, and most typically from 12 to 18 parts by weight based on 100 parts by weight based on 100 parts by weight of the polyol. Without intending to be bound by theory, it is believed that the alkylene oxide cap promotes an increase in a rate of the reaction, i.e., decreases a gel time, of the polyol and the isocyanate. As such, the alkylene oxide cap of the polyol, if included, typically allows the elastomeric composition to be effectively used in impingement mixing and spraying techniques to form the elastomer and articles formed therefrom, without dripping which typically contributes to a minimization of production costs.

The polyol is typically classified as "low-VOC". It is to be appreciated that the terminology "low-VOC" refers to a polyol that may include antioxidants, such as Irganox® 1135, commercially available from Ciba Specialty Chemicals of Tarrytown, N.Y., and/or ultraviolet absorbers, such as Tinuvin® 571, commercially available from Ciba Specialty Chemicals of Tarrytown, N.Y., and/or hindered amine light stabilizers, such as Tinuvin® 765, commercially available from Ciba Specialty Chemicals of Tarrytown, N.Y. The "low VOC" polyol is typically useful for forming elastomers that emit less than 100, more typically less than 85, and most typically less than 75 µg/g of volatile organic compounds over 0.5 hour at 90° C. in accordance with the VDA 278 test method.

The polyol also typically has a number average molecular weight of from 3,000 to 8,000 g/mol. More typically, the polyol has a number average molecular weight of from 4,000 to 7,000, and most typically from 4,500 to 6,800 g/mol. Without limiting the scope of the present invention, it is believed that the number average molecular weight of the polyol contributes to the flexibility of the elastomer.

The polyol also has a hydroxyl number of from 20 to 60 mg, typically from 22 to 56, and more typically from 24 to 36 mg KOH/g. The polyol also has a nominal functionality of from 2 to 4. Typically, the polyol has a nominal functionality of 3. Further, the polyol is typically present in the resin component in an amount of from 20 to 80, more typically from 30 to 50 parts by weight based on 100 parts by weight of the resin component. Still further, the polyol may also include a secondary functional group selected from the group of a carboxyl group, an amine group, a carbamate group, an amide group, an acrylate group, and an epoxy group. It is to be appreciated that the terminology "secondary" refers to a functional group other than a hydroxyl group. A suitable polyol is Pluracol® 2100, commercially available from BASF Corporation of Florham Park, N.J.

The elastomeric composition may also further comprise a second polyol. It is contemplated that the second polyol may be present in the resin component or may be independent from the resin component. The second polyol, if included, is different from the polyol present in the resin component. If the second polyol is included, the second polyol is typically selected from the group of polyetherols, polyesterols, polycaprolactones, and combinations thereof. The second polyol typically includes a polyetherol that is typically formed from a reaction of a second initiator and a second alkylene oxide. The second initiator may be any of the initiators described above for the polyol.

In the embodiment where the second polyol is the polyetherol, the second polyol also typically includes an alkylene oxide cap. It is to be understood that the terminology "cap" refers to a terminal portion of the polyetherol. The alkylene oxide cap typically includes ethylene oxide, propylene oxide, butylene oxide, amylene oxide, and combinations thereof. The alkylene oxide cap typically includes ethylene oxide. The alkylene oxide cap is typically of from 10 to 25, more typically from 10 to 20, and most typically from 12 to 18 parts by weight based on 100 parts by weight of the second polyol. Without intending to be bound by theory, it is believed that the alkylene oxide cap promotes an increase in a rate of the reaction, i.e., decreases a gel time, of the second polyol and the isocyanate. As such, the alkylene oxide cap of the second polyol, if included, typically allows the elastomeric composition to be effectively used in impingement mixing and spraying techniques to form the elastomer and articles formed therefrom, without dripping which typically contributes to a minimization of production costs.

The second polyol is also typically classified as "low-VOC". It is to be appreciated that the terminology "low-VOC" refers to a second polyol that may include antioxidants, such as Irganox® 1135, commercially available from Ciba Specialty Chemicals of Tarrytown, N.Y., and/or ultraviolet absorbers, such as Tinuvin® 571, commercially available from Ciba Specialty Chemicals of Tarrytown, N.Y., and/or hindered amine light stabilizers, such as Tinuvin® 765, commercially available from Ciba Specialty Chemicals of Tarrytown, N.Y. The "low VOC" second polyol is typically useful for forming elastomers that typically emit less than 100, more typically less than 85, and most typically less than 75 µg/g of volatile organic compounds over 0.5 hour at 90° C. in accordance with the VDA 278 test method.

The second polyol typically has a number average molecular weight of from 3,000 to 8,000 g/mol. More typically, the second polyol has a number average molecular weight of from 3,000 to 6,000, and most typically from 3,500 to 5,000 g/mol. The second polyol also typically has a hydroxyl number of from 20 to 60, more typically from 24 to 56, and most typically from 27 to 35 mg KOH/g. The second polyol also typically has a nominal functionality of from 2 to 4. Typically, the second polyol has a nominal functionality of 2. Further, the second polyol is typically present in the resin component in an amount of less than or equal to 30, more typically less than 15 parts by weight based on 100 parts by weight of the resin component. Still further, the second polyol may also include a secondary functional group selected from the group of a carboxyl group, an amine group, a carbamate group, an ester group, an amide group, an acrylate group, and an epoxy group. The second polyol may also include a polycaprolactone. Examples of polycaprolactones suitable for use as the second polyol include those commercially available from Dow Chemical Company of Midland, Mich. A suitable second polyol includes Pluracol® 1062, commercially available from BASF Corporation of Florham Park, N.J.

As first introduced above, the resin component includes the polyetheramine. The polyetheramine is polymeric. Without intending to be limited by theory, it is believed that the polyetheramine provides the elastomer formed from the elastomeric composition with excellent adhesion to surface coatings, including, but not limited to, one-component automotive coatings, two-component automotive coatings, clearcoats, industrial coatings, and varnishes. Excellent adhesion minimizes delamination of a surface coating and contributes to improved appearance of the elastomer and increased customer satisfaction. Without intending to be bound by any particular theory, it is believed that excellent adhesion is due to higher polarity of a urea bond in a polymer backbone which improves attraction of the polyetheramine to the surface coating, and to catalysis of a reaction of the isocyanate and hydroxyl or amine groups in the surface coating, as set forth in more detail below.

Examples of suitable polyetheramines include, but are not limited to, amine-terminated polyethers containing primary or secondary aromatically or aliphatically bound amino groups. Alternatively, the polyetheramine includes amine-terminated polyethers containing primary aliphatically bound amino groups. The amine-terminated polyethers may be prepared by any of several methods known in the art. For example, the amine-terminated polyethers may be prepared from polyhydroxyl polyethers and/or by hydrolysis of compounds containing isocyanate functional groups. Typically, the polyetheramine is a polyoxyalkyleneamine produced from a reaction of a polyol with ammonia and hydrogen in the presence of a nickel, copper, chromium catalyst. The polyoxyalkyleneamine typically includes primary amino groups attached to a terminus of a polyether backbone. The polyether backbone is typically based on propylene oxide, ethylene oxide, and/or combinations thereof. A suitable polyetheramine is Polyetheramine D 2000, commercially available from BASF Corporation of Florham Park, N.J.

The polyetheramine has an amine number of from 20 to 120, typically from 28 to 112, and more typically from 50 to 60. The polyetheramine also has a number average molecular weight of from 1,000 to 5,000, typically from 1,250 to 3,000, and more typically from 1,500 to 2,500 g/mol. One skilled in the art typically selects the polyetheramine within the described amine number and number average molecular weight ranges to provide excellent adhesion of the elastomer formed from the elastomeric composition to surface coatings and to improve temperature and chemical resistance of the elastomer without substantially increasing the hardness and/ or VOC emittance of the elastomer. Still further, the polyetheramine typically include of from 1.5 to 4 amine groups. Typically, the polyetheramine contains 2 amine groups.

The polyetheramine is typically present in the resin component in an amount of from 2 to 80, more typically 4 to 20 parts by weight based on 100 parts by weight of the resin component to provide excellent adhesion of the elastomer formed from the elastomeric composition to surface coatings.

As first introduced above, the elastomeric composition comprises the reaction product in the presence of the first catalyst and the second catalyst. That is, the composition of the present invention includes the reaction product of the resin component and the isocyanate component which are reacted or made in the presence of the first and second catalysts. Typically, the isocyanate component and the resin component are reacted at an isocyanate index of from 95 to 110, more typically from 95 to 105, and most typically from 99 to 101. The isocyanate index for the present invention is defined as 100 times the ratio of the number of isocyanate (NCO) groups in the isocyanate component to the number of hydroxyl (OH) groups in the resin component.

It is to be appreciated that the first catalyst and the second catalyst may be provided as a catalyst component. That is, the first catalyst and the second catalyst may be provided in combination as the catalyst component. Alternatively, the first catalyst may be provided separately from the second catalyst.

The first catalyst includes a metal selected from the group of tin, titanium, zirconium, hafnium, and combinations thereof. Typically, the first catalyst increases the rate of the reaction of the polyol and the isocyanate, i.e., decreases gel time, to form the elastomer. Typically, the first catalyst includes the general structure:

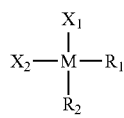

wherein M is selected from the group of tin, titanium, zirconium and hafnium, $X_1$ and $X_2$ are each independently selected from the group of a methyl group, a butyl group, or an octyl group, and $R_1$ and $R_2$ are selected from compounds having the general structure

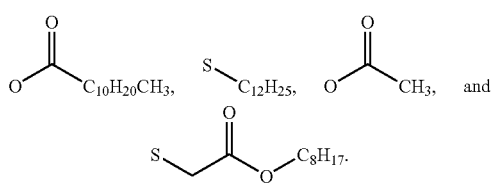

Typically, M is tin. In all embodiments of the present invention, any tin, titanium, zirconium, and/or hafnium present in the first catalyst form tin chelates, titanium chelates, zirconium chelates, and hafnium chelates, respectively. A suitable first catalyst is dimethyltin dimercaptide, commercially available under the trade name Fomrez® UL-22 from Momentive Performance Polymers of Wilton, Conn.

The first catalyst can generally be prepared via known reactions of tin, titanium, zirconium or hafnium compounds in a solution. The solution may include, but is not limited to, polyols such as propylene glycol, dipropylene glycol, 1,3-butylene glycol, 1,6-hexane diol, polypropylene glycol, polytetramethylene glycol, dimethoxy-dipropylene glycol, and combinations thereof. The solution may also include, but is not limited to, diluents including alcohols, butoxy/propoxy/ethoxy polypropylene ethylene glycol ethers, acetylacetonates of tin, titanium, zirconium or hafnium, and combinations thereof. As such, the first catalyst is typically useful for catalyzing reactions useful for forming elastomers that emit reduced VOCs when the first catalyst is used in combination with the second catalyst as compared to elastomers formed in the presence of conventional tin catalysts without the second catalyst present. The elastomers that emit reduced VOCs are typically used in embodiments of the present invention such as in the passenger compartment of an automobile.

The first catalyst is typically present in the elastomeric composition in an amount of from 0.005 to 0.10, more typically from 0.012 to 0.030 parts by weight based on 100 parts by weight of the resin component. In one embodiment of the present invention, the first catalyst is blended with the resin component prior to reaction with the isocyanate component. In another embodiment of the present invention, the first catalyst is combined with the isocyanate component. In another embodiment of the present invention, the first catalyst is blended neither with the resin component nor the isocyanate component. Typically, the first catalyst is present in the resin component. Alternatively, the catalyst component, comprising the first catalyst and the second catalyst, may be blended with the resin component prior to reaction with the isocyanate component or may be injected as a third stream separate from the resin component and the isocyanate component.

The first catalyst typically has an excellent catalytic efficiency for the reaction of the polyol and the isocyanate. The excellent catalytic efficiency increases the rate of the reaction, i.e., decreases the gel time, and allows the elastomeric composition to be sprayed, while minimizing dripping.

Further, the first catalyst typically has a decreased sensitivity to water and humidity present in the production environment and is not quickly deactivated when exposed to the water and humidity. Because of this decreased sensitivity, the humidity in the production environment does not have to be completely removed. Additionally, because the first catalyst is typically not quickly deactivated when exposed to water and humidity, less of the first catalyst is required for use in the reaction.

Still further, the first catalyst typically does not effectively catalyze an undesirable side reaction of water and humidity with the isocyanate. Reaction of water and humidity with the isocyanate forms gaseous carbon dioxide causing the elastomer to foam, as is well known in the art. Foaming the elastomer with the gaseous carbon dioxide is undesirable and forms voids and blisters in the elastomer. Formation of voids and blisters results in a degradation of physical properties of the elastomer including a weakened structural stability and a non-homogeneous density. As such, there are typically no chemical or physical blowing agents or expanding agents included in the elastomeric composition of the present invention. The first catalyst typically minimizes foaming and allows the elastomer to be formed with consistent physical properties thereby increasing a marketability of the elastomer.

The second catalyst, which is different from the first catalyst described above, includes an amine. The second catalyst may be blended with the resin component prior to reaction with the isocyanate component or may be injected as an additional stream separate from the resin component and the isocyanate component. Typically, the second catalyst is present in the resin component.

Typically, the second catalyst includes a tertiary amine. More specifically, the second catalyst typically includes N,N'-Bis[3-(dimethylamino)propyl]urea. A suitable second catalyst is Niax Catalyst EF-700, commercially available from Momentive Performance Polymers of Wilton, Conn.

The second catalyst is typically useful for catalyzing reactions useful for forming elastomers that emit reduced VOCs as compared to elastomers formed in the presence of conventional amine catalysts. The elastomers that emit reduced VOCs are therefore typically used in embodiments of the present invention such as in the passenger compartment of an automobile. Without intending to be limited by theory, it is believed that the elastomer typically emits reduced VOCs based on the molecular weight and polarity of the second catalyst and an affinity of the second catalyst for the elastomeric composition, or the formation of a biuret by the reaction of the isocyanate component with a urea linkage of the second catalyst. The affinity of the second catalyst for the elastomeric composition minimizes VOCs emitted by the elastomer. The second catalyst is typically included in an amount of from 0.5 to 2.0, more typically from 0.75 to 1.25, parts by weight per 100 parts by weight of the resin component.

The second catalyst typically allows an amount of more expensive catalysts to be reduced. Catalysts including amines are typically less expensive than metal catalysts. The second catalyst also does not typically include highly toxic metals that require costly disposal.

The present invention typically utilizes a dynamic interaction between the first and the second catalysts to typically form the elastomer. As such, the catalysts are typically balanced to achieve desirable properties in the elastomer.

It is contemplated that surface coatings may be used in conjunction with the present invention and that the surface coating may be applied to the elastomer. If the surface coating is used in conjunction with the present invention, the dynamic interaction between the first and the second catalysts decreases a time for paint adhesion of the elastomer. A time for paint adhesion is defined as the time at which a test plaque including an elastomer coated with a surface coating can be removed from an aluminum tool without visible delamination of the surface coating at an approximately 45° angle pull at a parting surface. A decreased time for paint adhesion of less than 2 minutes allows finished articles to be demolded at cycle times consistent with automotive interior production demands. Catalysis must be fine-tuned to allow the isocyanate component enough time to react with isocyanate reactive groups in the surface coating, as well as with the isocyanate reactive groups in the resin component. Without intending to be bound by any particular theory, it is believed that the time for paint adhesion is decreased due to catalysis of a reaction of the isocyanate and hydroxyl or amine groups in the surface coating. The time for paint adhesion for the elastomer is typically less than 60, more typically less than 45 seconds.

The dynamic interaction also typically decreases a demolding time, and facilitates a formation of the elastomer having improved tensile strength, Graves tear strength and elongation. Decreased demolding time increases the efficiency of forming the elastomer and increases production efficiency. Without intending to limit the scope of the present invention, it is believed that the demolding time is decreased because the dynamic interaction between the first and second catalysts increases the rate of the reaction of the polyol with the isocyanate. The demolding time is described in greater detail below.

Improved tensile strength of the elastomer reduces a chance that the elastomer may fail. Improved Graves tear strength of the elastomer reduces a possibility that the elastomer may tear. Improved elongation of the elastomer increases a chance that the elastomer may be flexible. Improved tensile strength, Graves tear strength, and elongation of the elastomer increase marketability of the elastomer.

Without intending to limit the scope of the present invention, it is believed that the tensile strength, Graves tear strength, and elongation are achieved through effective catalysis of a primary reaction between the polyol and the isocyanate and a minimization of the reaction between water and humidity and the isocyanate. The tensile strength, Graves tear strength, and elongation are described in further detail below.

The elastomeric composition may also include one or more additives. Typically, the additive is selected from the group of moisture scavengers, chain extenders, anti-foaming agents, processing additives, dispersion aids, chain terminators, surface-active agents, adhesion promoters, flame retardants, anti-oxidants, dyes, ultraviolet light absorbers, hindered amine light stabilizers, fillers, thixotropic agents, and combinations thereof.

Typically, the elastomeric composition further comprises a paste moisture scavenger. It is to be appreciated that the term paste refers to a pourable, non-powdered moisture scavenger. Moisture scavengers typically act as adsorbents for gases and liquids by trapping water and preventing water from reacting with isocyanates. Examples of suitable paste moisture scavengers include a blend of castor oil with any known molecular sieve powder known in the art, such as crystalline aluminosilicate. While an amount of the paste moisture scavenger included in the elastomeric composition is, in large part determined by an anticipated end use of the elastomer, the elastomeric composition typically includes of from 1 to 5, more typically from 1 to 3 parts by weight of the paste molecular sieve per 100 parts by weight of the resin component. A suitable paste moisture scavenger is Jacaab P3 paste, commercially available from Jacaab LLC of St. Louis, Mo.

Inclusion of the paste moisture scavenger minimizes production costs of the elastomer formed from the elastomeric composition as compared to conventional powdered moisture scavengers. The paste molecular sieve is typically easier to handle and incorporate into the elastomeric composition. As such, the production costs associated with extra labor necessary for adding powdered raw materials are typically minimized for elastomeric compositions including paste moisture scavengers. Minimization of production costs, in general, is desirable to minimize a cost of articles formed from the elastomeric composition.

The additive may also include a chain extender. Examples of suitable chain extenders include compounds having two functional groups with active hydrogen atoms including, but not limited to, hydrazine, primary and secondary diamines, alcohols, amino acids, hydroxy acids, glycols, and combinations thereof. Such chain extenders typically have a number average molecular weight of less than about 400 g/mol. However, chain extenders with number average molecular weights of greater than 400 g/mol are also contemplated for use. The chain extender is typically selected from the group of ethylene glycol, 1,4-butanediol, diethyltoluene diamine, 1,3-butanediol, propylene glycol, dipropylene glycol, diethylene glycol, and combinations thereof. Alternatively, the chain extender is selected from the group of 1,4-butanediol, 1,3-butanediol, ethylene glycol and combinations thereof. A suitable chain extender is 1,4-butanediol, commercially available from BASF Corporation of Florham Park, N.J.

Chain extenders typically act as polymer hard-segment forming agents upon reaction with isocyanates and improve physical characteristics of the elastomer. While an amount of chain extender included in the elastomeric composition is, in large part determined by an anticipated end use of the elastomer, the elastomeric composition typically includes of from 1 to 20, more typically from 6 to about 15, and most typically from 8 to about 12 parts by weight of the chain extender per 100 parts by weight of the resin component.

The elastomeric composition may also include an anti-foaming agent as an additive. The anti-foaming agent typically acts to break an interface of gaseous carbon dioxide bubbles formed from the reaction of water and humidity with the isocyanate. The anti-foaming agent also typically acts to release any trapped gas present from mixing and/or applying the elastomeric composition. The anti-foaming agent typically includes a silicone liquid commercially available from Dow Corning of Midland, Mich., under the trade name of Antifoam-A. If included in the elastomeric composition, the anti-foaming agent is typically included in an amount of from 0.01 to 0.50, more typically from 0.05 to 0.15 parts by weight of the anti-foaming agent per 100 parts by weight of the resin component.

The elastomeric system of the present invention includes the isocyanate component and the resin component comprising the polyol and the polyetheramine, the first catalyst comprising the metal, and the second catalyst comprising the amine. Like the elastomeric composition described above, the elastomeric system may also include the second polyol and one or more additives as described above. The elastomeric system may be supplied to consumers by various packaging, such as in large-sized drums and containers or smaller-sized kits and packets. For example, one kit can contain the resin component and another kit can contain the isocyanate component. It is to be appreciated that the polyol, the polyetheramine, and the second polyol may or may not already be combined to form the resin component, i.e., the elastomeric system may comprise two, three, or more distinct components, such as individual kits each including distinct components. Typically, the isocyanate component and the resin component are unreacted in the elastomeric system. That is, the elastomeric system typically comprises distinct components that are not yet the reaction product of the elastomeric composition set forth above.

The present invention further provides the method for making the elastomer. For the method, the isocyanate component and the resin component are provided. The isocyanate component and the resin component are combined in the presence of the first catalyst and the second catalyst to form the elastomeric composition. The method also includes applying the elastomeric composition, described above, to a mold having a mold cavity. Initially, the mold cavity is typically coated with a known mold release agent by spraying to facilitate an eventual demolding of the elastomer. However, the mold release agent may be applied to the mold cavity by other methods including pouring, brushing, or inclusion in the surface coating. If utilized, the mold release agent may include, but is not limited to, silicones, soaps, waxes, solvents, and combinations thereof.

Alternatively, or in addition to the application of the mold release agent, the surface coating may be sprayed, poured, or brushed into the mold cavity. The surface coating may be selected from a variety of water and solvent borne solutions. For example, the surface coating may include a composition including enamel or elastomeric compositions. Among the numerous available surface coatings which are suitable for use in the present invention, the typical surface coatings for use in the present invention include Protothane®, commercially available from Titan Finishes Corporation of Detroit, Mich., Polane®, commercially available from Sherwin Williams, Inc. of Cleveland, Ohio, and Rimbond®, commercially available from Lilly Corporation of Aurora, Ill.

To form the elastomeric composition, the resin component, the isocyanate component, the first catalyst, and the second catalyst are typically mixed by impingement mixing in a head of a spray gun. More specifically, the polyol, the polyetheramine, and, if present, the chain extender of the resin component and the isocyanate of the isocyanate component are typically reacted to form the elastomeric composition. The elastomeric composition is typically applied over the mold release agent and/or surface coating if present and, in the absence thereof, directly to the surface of the mold cavity. The elastomeric composition may be sprayed, injected, or poured into the mold cavity. Typically, the elastomeric composition is sprayed into the mold cavity. As understood by those skilled in the art, the amount of water and humidity present in the mold cavity is an important condition to be considered when forming the elastomer. Typically, the amount of water and humidity is minimized to reduce any possible foaming of the elastomer. However, because of the first catalyst, some water and humidity may be present in the production environment without adversely affecting the reaction of the resin component with the isocyanate component. Typically, the elastomeric composition is applied to the mold cavity in the presence of less than 17, more typically less than 14, and most typically less than 7 $g/m^3$ absolute humidity.

If the elastomeric composition is sprayed into the mold cavity, spray processing parameters may be manipulated to ensure the quality of the elastomer formed from the elastomeric composition. The spray processing parameters that are typically manipulated include, but are not limited to, a temperature of the elastomeric composition and any additional components, a pressure of the elastomeric composition entering the spray gun, a throughput of the spray gun, a temperature of a mold, and a level of humidity in the environment. If the temperature of the elastomeric composition is manipulated, the temperature is typically maintained between 25 and 85, more typically between 55 and 74° C. Similarly, if the pressure of the elastomeric composition entering the spray gun is manipulated, the pressure is typically maintained between 700 and 3,000, more typically between 1,000 and 2,500 psi. Also, if the throughput of the spray gun is manipulated, the throughput is typically maintained between 5 and 50, more typically between 17 and 40 g/sec.

The method also includes curing the elastomeric composition to form the elastomer. Typically, the elastomeric composition is cured for 20 to 180 seconds, more typically from 30 to 90 seconds, and most typically from 45 to 70 seconds. Also, the elastomeric composition is typically cured at a temperature of 35 to 110, more typically from 45 to 80, and most typically of from 55 to 75° C. The method further includes demolding the elastomer from the mold cavity. The elastomer can typically be demolded from the mold cavity in less than about 2 minutes, more typically less than about 60 seconds.

The resulting elastomer typically has a Shore A hardness of less than 75, more typically less than 70, and most typically less than 65 as measured in accordance with the ASTM D-2240 test method. The Shore A hardness of less than 75 is especially desirable in automotive applications to increase customer satisfaction.

The present invention further provides an article comprising a first layer formed from the elastomeric composition. The first layer is typically the elastomer. The first layer typically has a thickness of from 0.025 to 0.070, more typically 0.035 to 0.050 inches. The article may further comprise a second layer disposed on the first layer. That is, the article may be a composite comprising multiple layers. The second layer may be selected from the group of a second coating, i.e., a clearcoat or a varnish, a foam, a second elastomer and combinations thereof. Typically, the second layer is disposed on the first layer. The second layer may be applied to the elastomer in the mold or after the elastomer is demolded from the mold cavity. For example, in one embodiment, the clearcoat or the second elastomer may be applied to the demolded elastomer to form the article. In another embodiment, the clearcoat or the second elastomer may be applied to the cavity of the mold prior to applying the elastomeric composition and demolding the elastomer to form the article. In another embodiment, for example a bolster in the passenger compartment of an automobile, a composition may be injected, sprayed, or poured into the cavity of the mold to form the article including the foam disposed on the elastomer.

The article including the elastomer formed from the elastomeric composition typically emits less than 100, more typically less than 85, and most typically less than 75 µg/g of volatile organic compounds over 0.5 hour at 90° C. in accordance with the VDA 278 test method. The article also typically has a fog value of less than 250, more typically less than 200 µg/g over 1 hour at 160° C. in accordance with the VDA 278 test method. Further, the first layer of the article, i.e., the elastomer described above, typically has a Graves tear strength of from 100 to 350 pounds per linear inch as measured in accordance with the ASTM D-1004 test method. The elastomer also typically has a tensile strength of from 1000 to 1500 pounds per square inch before heat treatment as measured in accordance with the ISO 527-3 test method. Further, the elastomer typically has an elongation of from 125 to 400 percent before heat treatment as measured in accordance with the ISO 527-3 test method. As such, the article formed from the elastomeric composition of the present invention is suitable for use in an interior of an automobile, as the article typically emits reduced levels of VOCs and exhibits excellent Graves tear strength, tensile strength, and elongation as compared to articles formed from conventional elastomeric compositions.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

EXAMPLES

The following examples are merely intended to illustrate the invention and are not to be viewed in any way as limiting to the scope of the invention.

A series of elastomer plaques, Examples 1 through 3, is formed using the elastomeric composition of the present invention. To form the elastomer plaques, a resin component comprising Polyol A, Polyol B, Polyetheramine C, Catalyst D, Catalyst E, and Additives F-H is provided. An isocyanate component comprising Isocyanate X is also provided. The resin component and the isocyanate component are combined in a mixhead of a Decker C-Spray spray gun to form an elastomeric composition according to the processing parameters listed in Table 1. The elastomeric composition is applied on a 68° C. water-jacketed aluminum tool that is coated with Red Spot 458W black surface coating according to the processing parameters listed in Table 1. The elastomeric composition is cured on a heated tool at 68° C. for about 60 seconds to form the elastomer plaques. Three elastomer plaques are formed for each of Examples 1 through 3 corresponding to a reaction of the resin component and the isocyanate component at an isocyanate index of 97, 100, and 103, respectively.

A comparative elastomer plaque, Comparative Example 1, is also formed using a conventional elastomeric composition. A conventional resin component comprising Polyol B, Polyol L, Catalysts M, N, and P, and Additives G, H, J, and K is combined with the isocyanate component comprising Isocyanate X in the Decker C-Spray spray gun according to the processing parameters listed in Table 1. The comparative elastomeric composition is applied on a 68° C. water-jacketed aluminum tool that is coated with Red Spot 458W black surface coating according to the processing parameters listed in Table 1. The comparative elastomeric composition is cured on the heated tool at 68° C. for about 60 seconds to form the comparative elastomer plaques. Three comparative elastomer plaques are formed for Comparative Example 1 corresponding to a reaction of the conventional resin component and the isocyanate component at an isocyanate index of 97, 100, and 103, respectively.

TABLE 1

| Processing Parameter | Value |
|---|---|
| Material Temperature | 65° C. |
| Tool Temperature | 68° C. |
| Mix Pressure | 2,000 psi |
| Through-put | 25 g/s |

The specific amounts of each component in the elastomer and comparative elastomer are indicated below in Table 2, wherein all amounts are in parts by weight based on 100 parts by weight of all components before reaction of the resin component and the isocyanate component.

TABLE 2

| Component | Comp. Ex. 1 | Ex. 1 | Ex. 2 | Ex. 3 |
|---|---|---|---|---|
| Polyol A | | 75.237 | 74.887 | 75.707 |
| Polyol B | 12.000 | 4.000 | 4.000 | 4.000 |
| Polyetheramine C | | 8.000 | 8.000 | 8.000 |
| Catalyst D | | 0.013 | 0.013 | 0.028 |
| Catalyst E | | 1.000 | 1.000 | 0.500 |
| Additive F | | | 2.000 | |
| Additive G | 1.000 | 1.000 | | 1.000 |
| Additive H | 0.100 | 0.100 | 0.100 | 0.100 |
| Additive J | 0.650 | 0.650 | | 0.650 |
| Additive K | 10.000 | 10.000 | 10.000 | 10.000 |
| Polyol L | 75.772 | | | |
| Catalyst M | 0.028 | | | |
| Catalyst N | 1.000 | | | |
| Catalyst P | 0.100 | | | |
| Total | 100.000 | 100.000 | 100.000 | 100.000 |

Polyol A is a primary terminated conventional triol comprising a low volatile inhibitor package and an ethylene oxide cap. Polyol A has a hydroxyl number of from 24 to 26 mg KOH/g, a number average molecular weight of 6,500 g/mol, and a nominal functionality of 3.

Polyol B is a primary hydroxyl terminated diol comprising a low volatile inhibitor package and an ethylene oxide cap. Polyol B has a hydroxyl number of from 28 to 30 mg KOH/g, a number average molecular weight of 4,000 g/mol, and a nominal functionality of 2.

Polyetheramine C is a polymeric difunctional primary amine with a number average molecular weight of about 2,000 g/mol and an amine number of about 56.

Catalyst D is a dimethyltin dimercaptide catalyst.

Catalyst E is N,N'-Bis[3-(dimethylamino)propyl]urea.

Additive F is a paste moisture scavenger comprising a blend of castor oil with crystalline aluminosilicate. Additive F has a pore size of 3 Angstroms.

Additive G is a powdered molecular sieve comprising crystalline aluminosilicate. Additive G has a pore size of 3 Angstroms.

Additive H is an anti-foaming agent comprising a silicone liquid comprising a suspension of powdered silica.

Additive J is a hydrophobic fumed silica treated with dimethyldichlorosilane based on a hydrophilic fumed silica with a specific surface area of 130 m$^2$/g.

Additive K is 1,4-butanediol.

Polyol L is a triol having a hydroxyl number of from 34 to 36 mg KOH/g, a number average molecular weight of 4,800 g/mol, and a nominal functionality of 3.

Catalyst M is a bismuth-based catalyst.

Catalyst N is a 33 weight % 1,4-diazabicyclooctane crystal catalyst in about 67 weight % dipropylene glycol.

Catalyst P is a delayed-action heat-activated catalyst based on 1,8 diazabicyclo (5,4,0) undecene-7.

Isocyanate X is a liquid modified pure diphenylmethane diisocyanate having a % NCO content of 23% by weight, a nominal functionality of 2, and a density of 1.21 g/cm$^3$ at 25° C.

Samples of each of Comparative Example 1 and Example 2 are evaluated for volatile organic compound (VOC) emittance and fog value as determined in accordance with the VDA 278 test method. The results of these evaluations are presented in Table 3.

TABLE 3

|  | Comp. Ex. 1 | Ex. 2 |
| --- | --- | --- |
| VOC Emittance (µg/g) | 858 | 36.8 |
| Fog value (µg/g) | 74 | 237 |

The VOC evaluations determine a quantity of volatile organic compounds emitted from the elastomers of Comparative Example 1 and Example 2 over 0.5 hour at 90° C. The fog value evaluations determine a quantity of volatile organic compounds emitted from an elastomer of Comparative Example 1 and Example 2 over 1 hour at 160° C.

The VOC and fog value evaluations illustrate an advantage to using the resin component, first catalyst, second catalyst, and additives of Example 2. The resin component, first catalyst, second catalyst, and additives of the elastomeric compositions of Example 2 allow the elastomer formed from the elastomeric compositions of Example 2 to have a VOC emittance and fog value that minimize environmental pollution, which is desirable, and to comply with automotive industry standards for VOC emittance and fog value as measured by the VDA 278 test method, which is mandatory. The VOC emittance and fog value of elastomers of Example 2 are especially desirable in automotive applications to reduce odors in a passenger compartment of an automobile and to increase customer satisfaction.

Figure 8:
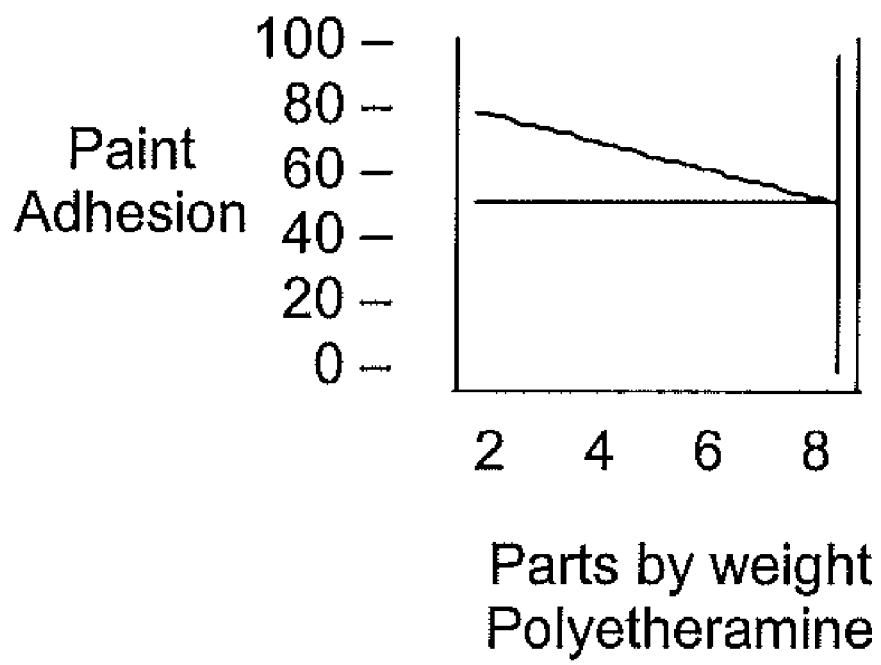
FIG. 8 is a graph illustrating time for paint adhesion, measured in seconds, as a function of an amount of a polyetheramine in a resin component of an elastomeric composition.

A sample elastomer plaque is also evaluated for time for paint adhesion as determined in accordance with the following procedure. The elastomer plaque is formed using the elastomeric composition of the present invention. To form the elastomer plaque, 113.8 grams of the resin component comprising Polyol A, Polyol B, Polyetheramine C, Catalyst D, Catalyst E, and Additives F-H at ratios corresponding to the amounts listed in Table 2 is combined with 56.2 grams of the isocyanate component comprising Isocayante X in a 400 ml tripour beaker at 77° F. and mixed at 3,100 rpm using a German 3" mix blade for 7 seconds to form the elastomeric composition of Example 2. The elastomeric composition is poured on a 68° C. water-jacketed aluminum tool coated with a first layer of a mold release agent and a second layer of Red Spot 458W black surface coating. The elastomeric composition is drawn down with a drawbar to a thickness of about 0.040 inches to form the elastomer plaque. The time for paint adhesion, i.e., the time at which the elastomer plaque can be removed from the aluminum tool without visible delamination of the surface coating at an approximately 45° angle pull at a parting surface, is visually observed. A statistical analysis is performed using the statistical software package JMP® 6.1 to predict the time for paint adhesion as the amount of Polyetheramine C is increased from 2 to 8 parts by weight based on 100 parts of the resin component. The statistical software package JMP® 6.1 predicts that the time for paint adhesion will decrease by 18.9 seconds as the amount of Polyetheramine C is increased from 2 to 8 parts by weight based on 100 parts by weight of the resin composition. The results of these evaluations are presented in FIG. 8.

The time for paint adhesion evaluations illustrate an advantage to using the resin component, first catalyst, second catalyst, and additives of Example 2. The resin component, first catalyst, second catalyst, and additives allow the elastomer formed from the elastomeric compositions of Example 2 to have a time for paint adhesion of less than 60 seconds, which allows finished articles to be demolded at cycle times consistent with automotive interior production demands while minimizing delamination of the surface coating.

Samples of each of Comparative Example 1 and Examples 1 through 3 are evaluated for tensile strength, elongation, and Graves tear strength, as determined by ISO 527-3, ISO 527-3, and ASTM D-1004, respectively. The results of these evaluations are presented in FIGS. 1 through 7 as distribution graphs created using the statistical software package JMP® 6.1, as is known in the art.

The Graves tear strength evaluations are made to determine a force need to rupture the elastomers of Comparative Example 1 and Examples 1 though 3 by pulling a prepared notched sample. Specifically, FIG. 1 depicts the results of the Graves tear strength evaluation without heat treatment, at room temperature, at an isocyanate index of 97, 100, and 103 respectively for the elastomers of each of Comparative Example 1 and Examples 1 through 3.

The Graves tear strength evaluations at room temperature illustrate an advantage to using the resin component, first catalyst, second catalyst, and additives of Example 2. The resin component, first catalyst, second catalyst, and additives of the elastomeric composition of Example 2 allow the elastomer to exhibit a Graves tear strength that minimizes a possibility of tearing and splitting, which is desirable.

Figure 2:
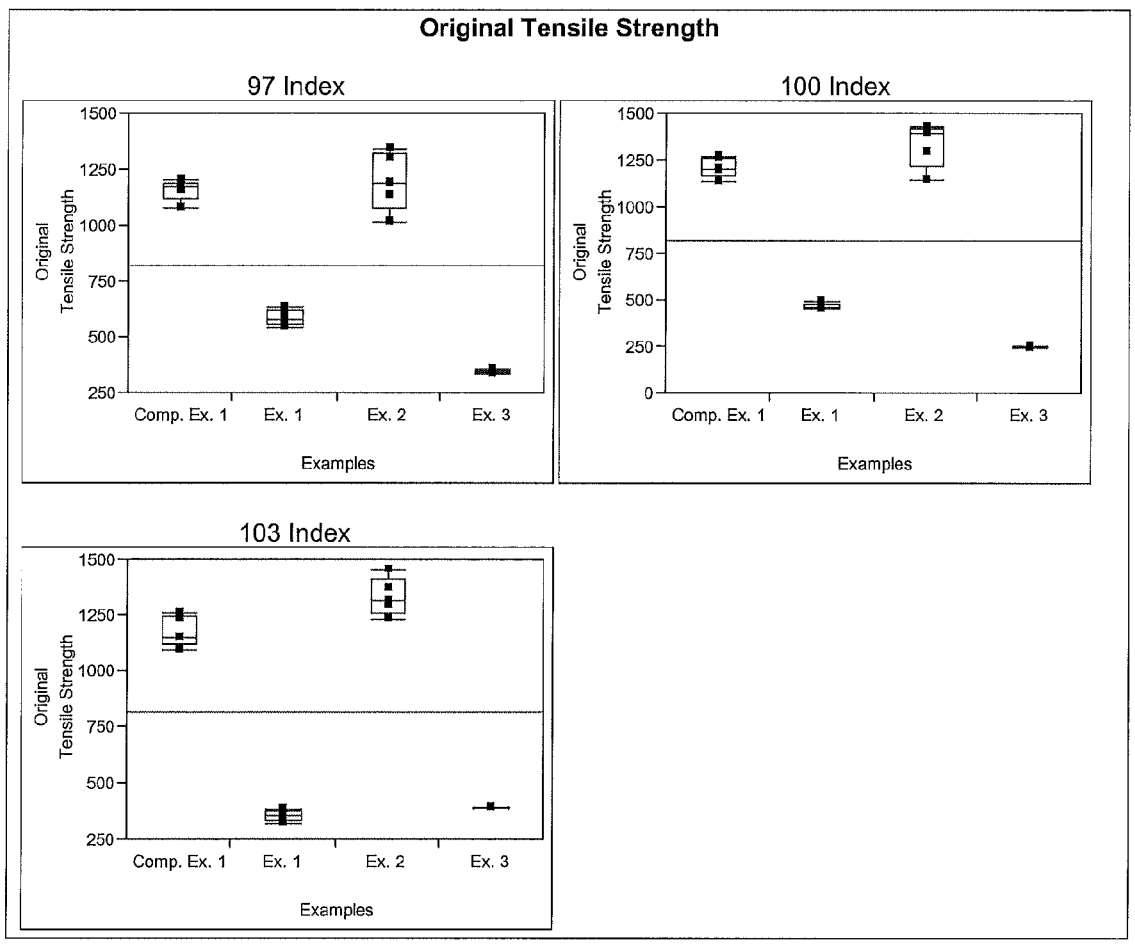
FIG. 2 is a distribution graph illustrating original tensile strength at room temperature of the elastomers of Comparative Example 1 and Examples 1 through 3, in pounds per square inch.
Figure 4:
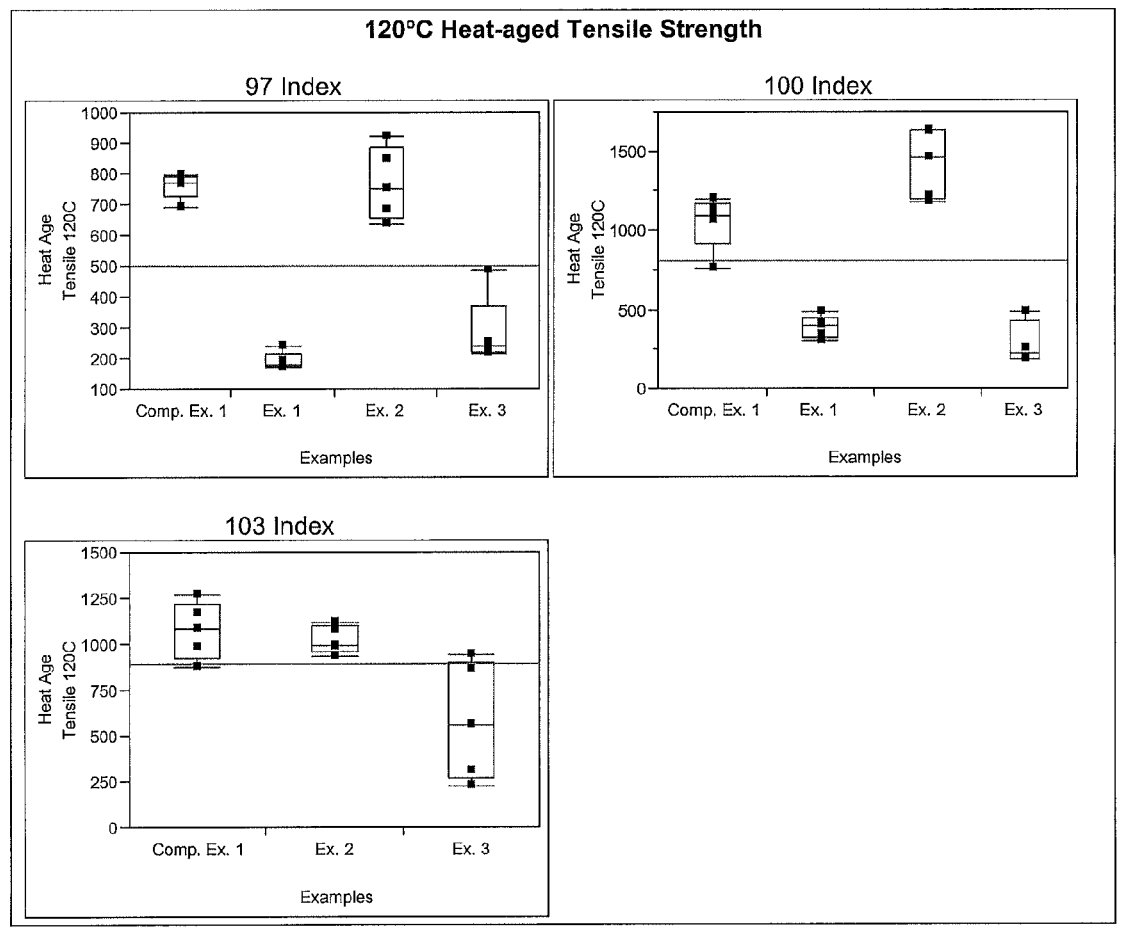
FIG. 4 is a distribution graph illustrating tensile strength of the elastomers of Comparative Example 1 and Examples 1 through 3, measured in pounds per square inch after the elastomers were heat treated for 500 hours at 120° C.
Figure 5:
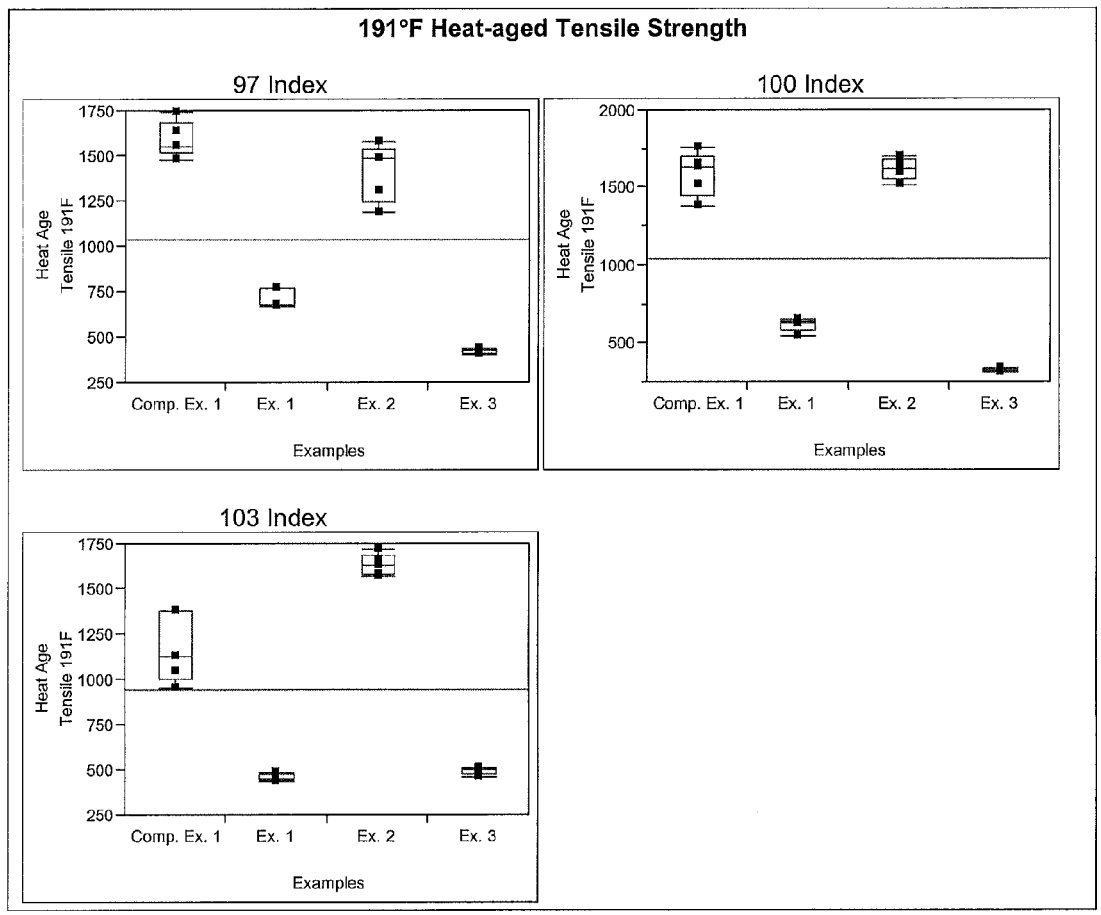
FIG. 5 is a distribution graph illustrating tensile strength of the elastomers of Comparative Examples 1 and Examples 1 through 3, measured in pounds per square inch after the elastomers were heat treated for 500 hours at 191° C.

The tensile strength evaluations are made to determine a maximum stress that each of the elastomers of Comparative Example 1 and Examples 1 through 3 can withstand, while subjected to a stretching load, without breaking. The tensile strength evaluations are made both before and after heat treatment of the elastomers. Specifically, FIG. 2 depicts the results of tensile strength evaluations without heat treatment, at room temperature, for each of the elastomers of Comparative Example 1 and Examples 1 through 3. Specifically, each of the elastomers of Comparative Example 1 and Examples 1 through 3 is evaluated for tensile strength after heat treatment at 120° C. for 500 hours and 191° C. for 500 hours as seen in FIGS. 4 and 5, respectively.

The tensile strength evaluations at room temperature illustrate that the resin component, first catalyst, second catalyst, and additives of the elastomeric composition of Example 2 allow the elastomer of Example 2 to exhibit average tensile strengths of greater than 1,250 psi, as seen in FIG. 2. The tensile strengths of greater than 1,250 psi minimize possible breaking of the elastomers of Example 2, which is desirable.

The tensile strength evaluations after heat treatment also illustrate an advantage to using the resin component, first catalyst, second catalyst, and additives of Example 2. The resin component, first catalyst, second catalyst, and additives allow the elastomer of Example 2, after heat treatment, to exhibit an increasing tensile strength with increasing temperature of the heat treatment, as seen in FIGS. 4 and 5. A benefit of using the elastomer of Example 2 includes maintaining a suitable tensile strength. If used in automobile applications such as in door bolsters, the elastomers of Example 2 can provide a desirable level of tensile strength, thereby reducing a possibility that a surface of the door bolster may break.

Figure 3:
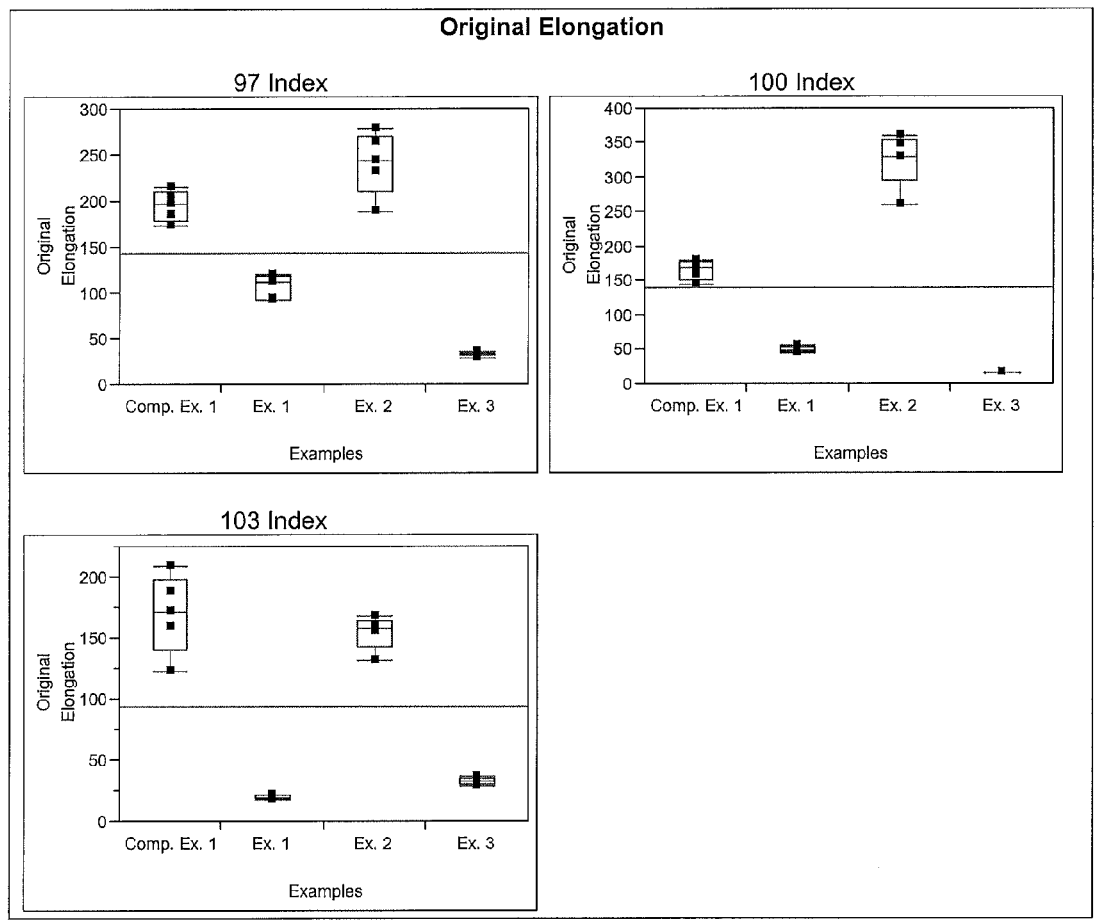
FIG. 3 is a distribution graph illustrating original elongation at room temperature of the elastomers of Comparative Example 1 and Examples 1 through 3, measured in percent.
Figure 6:
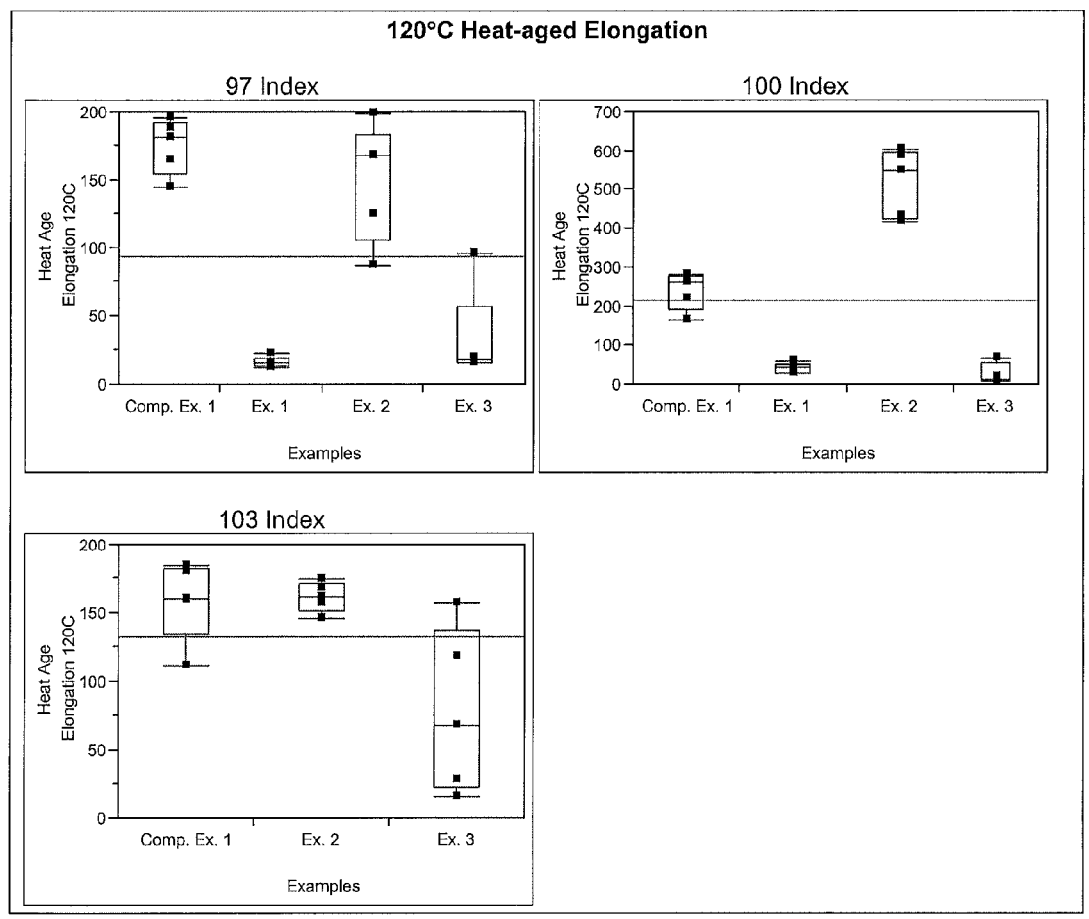
FIG. 6 is a distribution graph illustrating elongation of the elastomers of Comparative Examples 1 and Examples 1 through 3, measured in percent after the elastomers were heat treated for 500 hours at 120° C.
Figure 7:
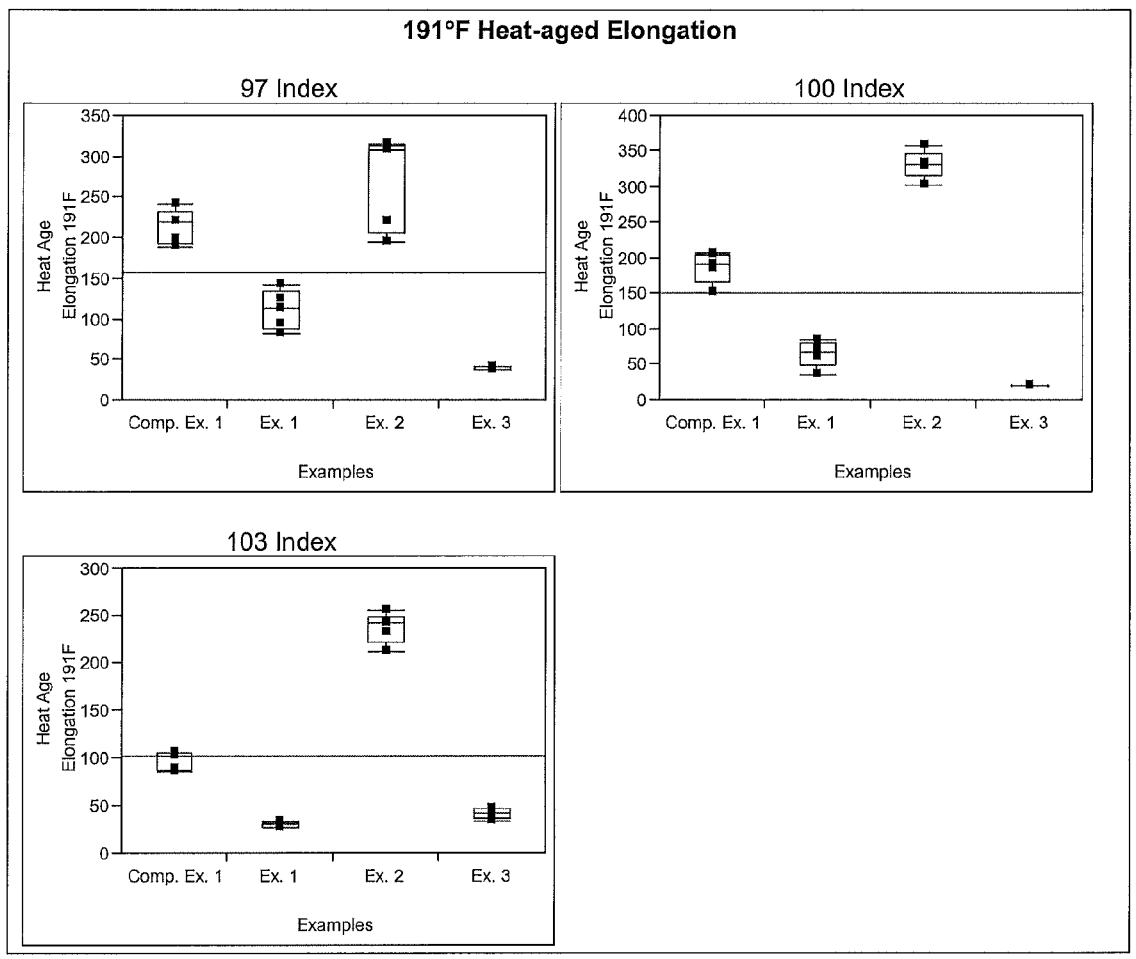
FIG. 7 is a distribution graph illustrating elongation of the elastomers of Comparative Examples 1 and Examples 1 through 3, measured in percent after the elastomers were heat treated for 500 hours at 191° C.

The elongation evaluations are made to determine an increase in a length of elastomers of Comparative Example 1 and Examples 1 through 3 due to tension applied. The elongation evaluations, like the tensile strength evaluations, are made both before and after heat treatment of the elastomers. Specifically, each of the elastomers of Comparative Example 1 and Examples 1 through 3 is evaluated for elongation without heat treatment, at room temperature, as seen in FIG. 3. Also, each of the elastomers of Comparative Example 1 and Examples 1 through 3 is evaluated for elongation after heat treatment at 120° C. for 500 hours and at 191° C. at 500 hours as seen in FIGS. 6 and 7, respectively.

The elongation evaluations at room temperature illustrate that the resin component, first catalyst, second catalyst, and additives allow the elastomer of Example 2 to exhibit elongations of from 125 to 325%, as seen in FIG. 3. If a surface coating is applied to the elastomer, a greater elongation maximizes a possibility that the elastomers will exhibit minimal rigidity and will stretch. Minimal rigidity is desirable to maximize a possibility that the elastomer will stretch at least as much as the surface coating so that the surface coating will not delaminate.

The elongation evaluations after heat treatment also illustrate an advantage to using the resin component, first catalyst, second catalyst, and additives of Example 2. The resin component, first catalyst, second catalyst, and additives allow the elastomers of Example 2 to have a desirable level of elongation after heat treatment, thereby additionally maximizing a possibility that the elastomer of Example 2 will have minimal rigidity and will stretch if used in the door bolster.

Obviously, many modifications and variations of the present invention are possible in light of the above teachings. The invention may be practiced otherwise than as specifically described within the scope of the appended claims.

What is claimed is:

1. An elastomeric composition comprising a reaction product of:
    a resin component comprising;
        a polyetherol comprising an ethylene oxide cap of from 5 to 20 parts by weight based on 100 parts by weight of said polyetherol, having a hydroxyl number of from 20 to 60 mg KOH/g, and having a nominal functionality of from 2 to 4; and
        a polyetheramine having an amine number of from 20 to 120 and a number average molecular weight of from 1,000 to 5,000 g/mol; and
    an isocyanate component;
    in the presence of;
    a first catalyst comprising a metal selected from the group of tin, titanium, zirconium, hafnium, and combinations thereof; and
    a second catalyst comprising a urea that reacts with said isocyanate component to reduce emission of volatile organic compounds,
    wherein said elastomeric composition is used for adhesion to a one-component automotive coating; and
    wherein said elastomeric composition has a paint adhesion time to the one-component automotive coating of less than 2 minutes.

2. An elastomeric composition as set forth in claim 1 wherein said polyetheramine is present in said resin component in an amount of from 2 to 80 parts by weight based on 100 parts by weight of said resin component.

3. An elastomeric composition as set forth in claim 1 wherein said polyetheramine is present in said resin component in an amount of from 4 to 20 parts by weight based on 100 parts by weight of said resin component.

4. An elastomeric composition as set forth in claim 2 wherein said polyetherol is present in said resin component in an amount of from 20 to 80 parts by weight based on 100 parts by weight of said resin component.

5. An elastomeric composition as set forth in claim 1 further comprising a second polyol having a hydroxyl number of from 20 to 60 mg KOH/g and a nominal functionality of from 2 to 4.

6. An elastomeric composition as set forth in claim 1 wherein said first catalyst is present in said elastomeric composition in an amount of from 0.005 to 0.10 parts by weight based on 100 parts by weight of said resin component.

7. An elastomeric composition as set forth in claim 1 wherein said second catalyst is present in an amount of from 0.5 to 2.0 parts by weight based on 100 parts by weight of said resin component.

8. An elastomeric composition as set forth in claim 1 wherein said resin component further comprises a paste moisture scavenger present in said resin component in an amount of from 1 to 5 parts by weight based on 100 parts by weight of said resin component.

9. An elastomeric system comprising:
    a resin component comprising;
        a polyetherol comprising an ethylene oxide cap of from 5 to 20 parts by weight based on 100 parts by weight of said polyetherol, having a hydroxyl number of from 20 to 60 mg KOH/g, and having a nominal functionality of from 2 to 4; and
        a polyetheramine having an amine number of from 20 to 120 and a number average molecular weight of from 1,000 to 5,000 g/mol;
    an isocyanate component;
    a first catalyst comprising a metal selected from the group of tin, titanium, zirconium, hafnium, and combinations thereof; and
    a second catalyst comprising a urea that reacts with said isocyanate component to reduce emission of volatile organic compounds,
    wherein said elastomeric composition is used for adhesion to a one-component automotive coating; and
    wherein said resin component and said isocyanate component react to form an elastomeric composition having a paint adhesion time to the one-component automotive coating of less than 2 minutes.

10. An elastomeric system as set forth in claim 9 wherein said polyetheramine is present in said resin component in an amount of from 2 to 80 parts by weight of said resin component.

11. An elastomeric system as set forth in claim 9 wherein said resin component further comprises a paste moisture scavenger.

12. A method of making an elastomer, said method comprising the steps of:
   providing an isocyanate component;
   providing a resin component comprising;
     a polyetherol comprising an ethylene oxide cap of from 5 to 20 parts by weight based on 100 parts by weight of the polyetherol, having a hydroxyl number of from 20 to 60 mg KOH/g, and having a nominal functionality of from 2 to 4; and
     a polyetheramine having an amine number of from 20 to 120 and a number average molecular weight of from 1,000 to 5,000 g/mol;
   combining the isocyanate component and the resin component in the presence of;
     a first catalyst comprising a metal selected from the group of tin, titanium, zirconium, hafnium, and combinations thereof; and
     a second catalyst comprising a urea to form an elastomeric composition wherein the urea reacts with the isocyanate component to reduce emission of volatile organic compounds;
   applying the elastomeric composition to a mold having a mold cavity;
   curing the elastomeric composition to form the elastomer; and
   demolding the elastomer from the mold cavity,
   wherein the elastomeric composition is used for adhesion to a one-component automotive coating, and
   wherein the elastomeric composition has a paint adhesion time to the one-component automotive coating of less than 2 minutes.

13. A method as set forth in claim 12 wherein the polyetheramine is present in said resin component in an amount of from 2 to 80 parts by weight based on 100 parts by weight of said resin component.

14. A method as set forth in claim 13 wherein the polyetherol is present in said resin component in an amount of from 20 to 80 parts by weight based on 100 parts by weight of said resin component.

15. An elastomeric composition as set forth in claim 1 wherein said ethylene oxide cap of said polyetherol is from 10 to 20 parts by weight.

16. An elastomeric composition as set forth in claim 1 wherein said ethylene oxide cap of said polyetherol is from 12 to 18 parts by weight.

17. An article comprising a one-component automotive coating and a first layer that is formed from an elastomeric composition and that is disposed on said one-component automotive coating, said elastomeric composition comprising a reaction product of:
   a resin component comprising;
     a polyetherol comprising an ethylene oxide cap of from 5 to 20 parts by weight based on 100 parts by weight of said polyetherol, having a hydroxyl number of from 20 to 60 mg KOH/g, and having a nominal functionality of from 2 to 4; and
     a polyetheramine having an amine number of from 20 to 120 and a number average molecular weight of from 1,000 to 5,000 g/mol; and
   an isocyanate component;
   in the presence of;
     a first catalyst comprising a metal selected from the group of tin, titanium, zirconium, hafnium, and combinations thereof; and
     a second catalyst comprising a urea that reacts with said isocyanate component to reduce emission of volatile organic compounds,
   wherein said elastomeric composition has a paint adhesion time to said one-component automotive coating of less than 2 minutes.

18. An article as set forth in claim 17 that emits less than 100 µg/g of volatile organic compounds over 0.5 hour at 90° C.

19. An article as set forth in claim 17 that has a fog value of less than 250 µg/g over 1 hour at 160° C.

20. An article as set forth in claim 17 that emits less than 100 µg/g of volatile organic compounds over 0.5 hour at 90° C. and that has a fog value of less than 250 µg/g over 1 hour at 160° C.

21. An article as set forth in claim 20 wherein said urea is a tertiary amine.

22. An article as set forth in claim 17 wherein said urea is a tertiary amine.

23. An article as set forth in claim 22 wherein said tertiary amine is N,N'-Bis[3-(dimethylamino)propyl]urea.

24. An article as set forth in claim 17 wherein said metal is selected from the group of titanium, zirconium, hafnium, and combinations thereof.

25. An article as set forth in claim 17 that emits less than 100 µg/g of volatile organic compounds over 0.5 hour at 90° C. and that has a fog value of less than 250 µg/g over 1 hour at 160° C., wherein said urea is a tertiary amine, and wherein said metal is selected from the group of titanium, zirconium, hafnium, and combinations thereof.

26. A method of forming an article comprising a one-component automotive coating and a first layer that is formed from an elastomeric composition and that is disposed on the one-component automotive coating, said method comprising the steps of:
   providing an isocyanate component;
   providing a resin component comprising;
     a polyetherol comprising an ethylene oxide cap of from 5 to 20 parts by weight based on 100 parts by weight of the polyetherol, having a hydroxyl number of from 20 to 60 mg KOH/g, and having a nominal functionality of from 2 to 4; and
     a polyetheramine having an amine number of from 20 to 120 and a number average molecular weight of from 1,000 to 5,000 g/mol;
   combining the isocyanate component and the resin component in the presence of;
     a first catalyst comprising a metal selected from the group of tin, titanium, zirconium, hafnium, and combinations thereof; and
     a second catalyst comprising a urea to form an elastomeric composition, wherein the urea reacts with the isocyanate component to reduce emission of volatile organic compounds;
   applying the one-component automotive coating to a mold having a mold cavity;
   applying the elastomeric composition onto the one-component automotive coating in the mold;

curing the elastomeric composition to form the article comprising the one-component automotive coating and the first layer disposed on the one-component automotive coating; and demolding the article from the mold cavity, wherein the elastomeric composition has a paint adhesion time to the one-component automotive coating of less than 2 minutes.

27. A method as set forth in claim 26 wherein the article emits less than 100 µg/g of volatile organic compounds over 0.5 hour at 90° C.

28. A method as set forth in claim 27 wherein the article has a fog value of less than 250 µg/g over 1 hour at 160° C.

* * * * *